June 8, 1965  W. F. MOTT  3,188,102
CHUCK
Filed Jan. 28, 1964  2 Sheets-Sheet 1

INVENTOR.
WALTER F. MOTT
BY
Cullen, Sloman & Cantor
ATTORNEYS

June 8, 1965          W. F. MOTT          3,188,102
CHUCK
Filed Jan. 28, 1964                    2 Sheets-Sheet 2
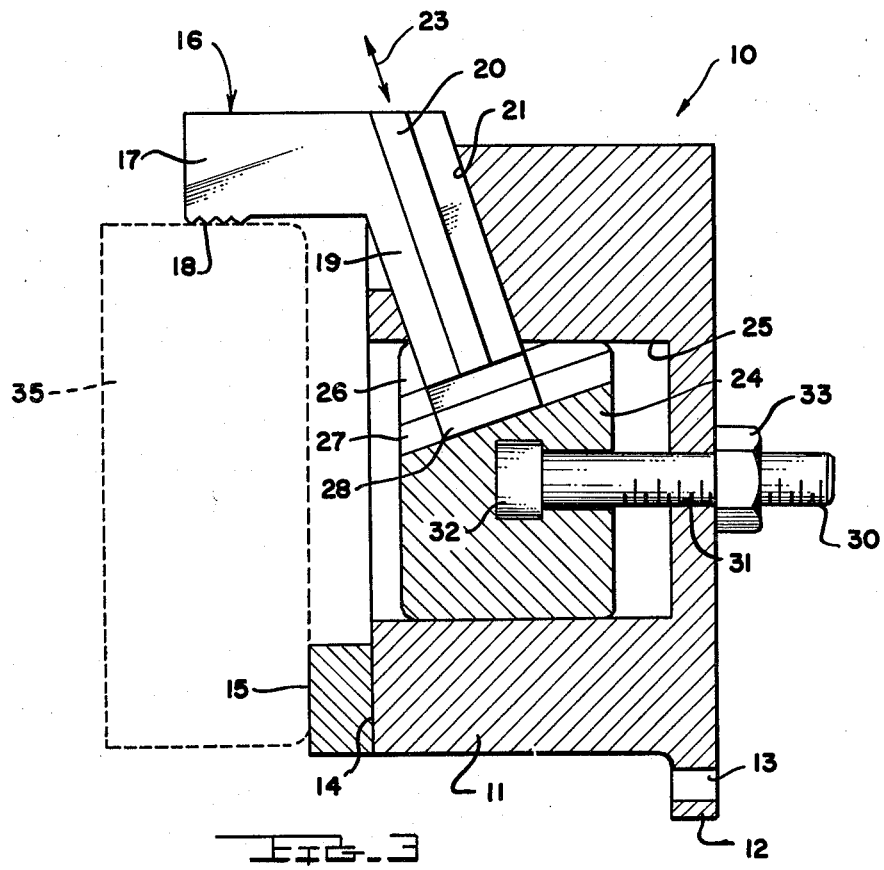
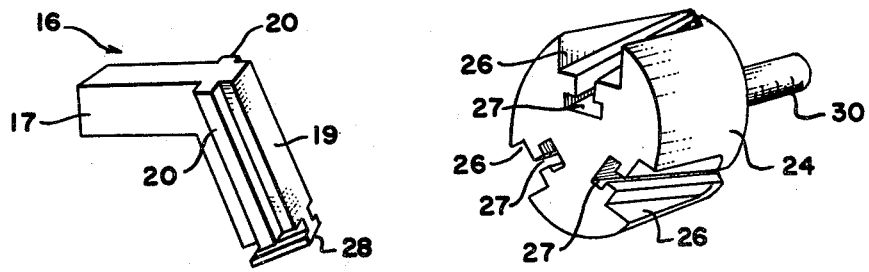
INVENTOR.
WALTER F. MOTT
BY
Cullen, Sloman & Cantor
ATTORNEYS United States Patent Office 3,188,102
Patented June 8, 1965

3,188,102
CHUCK
Walter F. Mott, St. Clair Shores, Mich., assignor to Schulze & Burgess Co., Hazel Park, Mich.
Filed Jan. 28, 1964, Ser. No. 340,681
1 Claim. (Cl. 279—121)

This invention relates to a chuck and more particularly to a chuck having angularly slidable jaws, which move at an angle with respect to the axis of the chuck, to thereby prevent canting or pivoting of the jaws and to draw the work piece against the chuck face.

Other objects and advantages of this invention will become apparent upon reading the following description, of which the attached drawings form a part.

In these drawings:

FIG. 3 is an elevational, cross-sectional view taken in the direction of arrows 3—3 of FIG. 1.

FIG. 4 is a perspective view, to a smaller scale, of one chuck jaw.

FIG. 5 is a perspective view, also to a smaller scale, of the quill for moving the chuck jaw.

Figure 1:
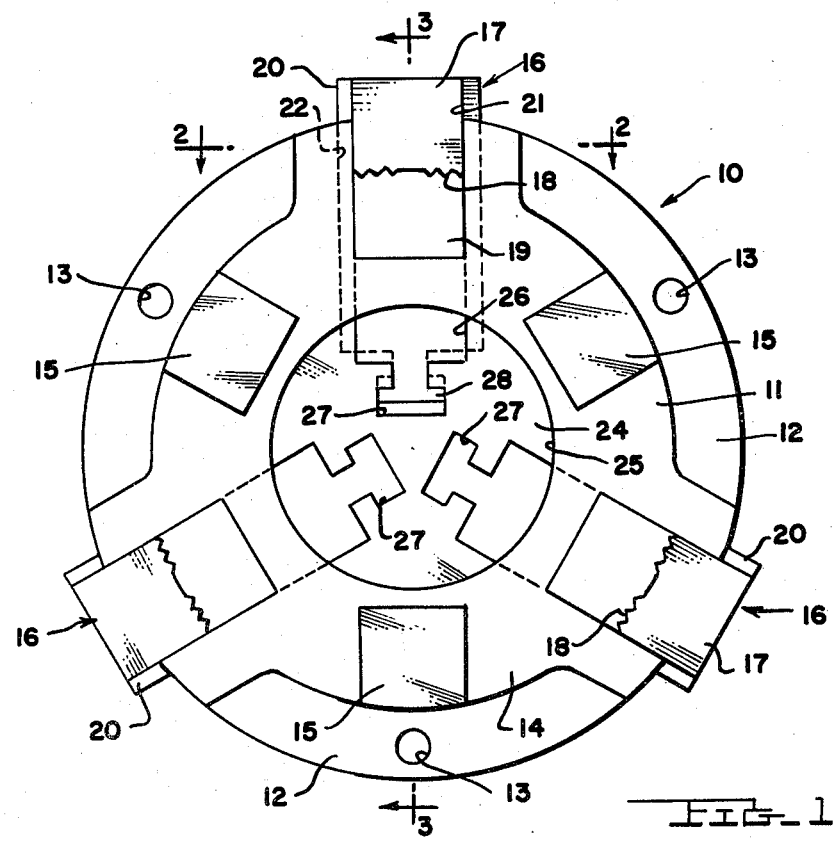
FIG. 1 is a front elevational view of the chuck herein.
Figure 2:
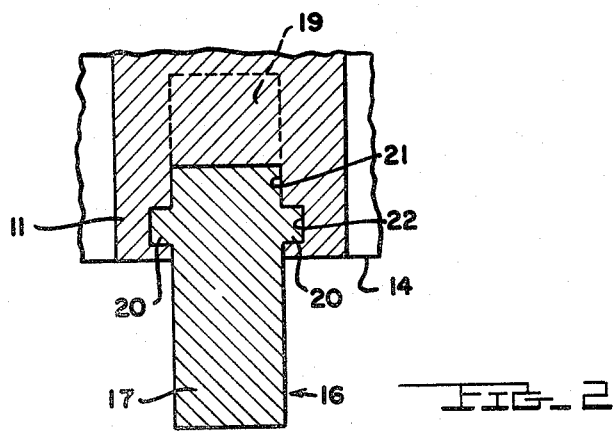
FIG. 2 is a fragmentary, cross-sectional view taken in the direction of arrows 2—2 of FIG. 1.

The chuck, generally designated 10, has a body 11, provided with edge flanges 12 with bolt openings 13 through which bolts may be inserted for fastening the chuck body to the mounting plate of a grinder or lathe or the like machine tool. The chuck body has a forward or chucking face 14 upon which are fastened pads 15 for engaging and positioning the face of a work piece.

The chuck is provided with a number of generally L-shaped jaws 16, each having a chucking or work piece engaging leg 17 having a high friction, roughened work piece engaging portion 18, which may be on the lower surface, as shown in FIG. 3, for chucking on the outside diameter of the work piece, or in the alternative, may be on the opposite face for pressing and gripping against the inside diameter of a work piece. In addition, each jaw has a support or mounting leg 19 projected with oppositely extending integral tongues 20. The leg 19 fits into a track 21 formed in the chuck body and the tongues 20 fit into guide channels 22 opening into the track 21. Thus, each jaw is slidable towards and away from the central axis of the chuck body as illustrated by the arrow 23 (see FIG. 3).

The mounting or support leg 19 of each jaw is arranged at an acute angle relative to the center line of the chuck so that the jaws move inwardly and outwardly at an acute angle relative to, but within a plane passing through, the center axis of the chuck body.

A means is provided for moving the jaws simultaneously and for holding them in predetermined positions. One suitable means, as illustrated, comprises a cylindrical quill 24, slidably fitted and guided for axial movement in a cylindrical bore 25 in the chuck body 10, and having sloped grooves 26 and jaw ways 27 which interlockingly receive interlocking tongues 28 on the inner ends of the legs 19. Thus, guided axial movement of the quill 24 causes the tongues 28 to slide within the jaw ways 27 while the jaws are interlocked to the quill for thereby moving the jaws either inwardly or outwardly.

To move the quill, a bolt 30 is threadedly engaged within a threaded opening 31 in the body. The bolt head 32 and the shank portion near the head are loosely fitted within corresponding openings formed in the quill. Thus, turning a nut 33 causes the bolt to move axially (to the left or right) thereby moving the quill axially and thus causing the jaw members to move inwardly or outwardly.

Other conventional means for moving chuck jaws may be substituted for the above means without departing from the scope of this invention.

With the mounting leg of each jaw arranged at an angle to the chuck axis, movement of the jaws towards the center line results not only in clamping against the work piece 35 but also results in drawing the work piece tightly against the pads 15 arranged on the face of the chuck. Thus, tightening the jaws against the work piece simultaneously, properly positions the work piece.

This invention may be further developed within the scope of the following claims. Accordingly, it is desired that the foregoing description be read as being merely illustrative of an operative embodiment of this invention and not in a strictly limited sense.

I now claim:

A chuck comprising a body having a central axial cylindrical bore and a front chucking face normal to the axis of the body and bore;

said body having jaw tracks projecting angularly forward and radially outward from said bore to the outer surface of the body;

L-shaped jaws, each having a mounting leg and a chucking leg, with the chucking leg being parallel to the axis of the bore;

the two legs being angularly related to each other in the same angular relation as that between the axis of the bore and the axis of the respective jaw track;

with the mounting leg being in the respective jaw track;

a cylindrical quill slidably fitted in said bore and guided by it for axial movement in said bore; with means for axially moving said quill in said bore;

the quill having in its exterior surface longitudinally extending jaw ways, each adjacent to a jaw track, with each sloping on an acute angle relative to the quill and bore axis and to the adjacent jaw track such that the jaw way extends normal to the axis of the adjacent jaw track and the mounting leg of the jaw therein;

and means on the inner end of each mounting leg interlocking with the adjacent jaw way for interlocking such leg to the quill and arrange to permit relative sliding movement of such inner end of such mounting leg and the adjacent jaw way;

whereby axial guided movement of the quill causes movement of the mounting legs of the jaws in the jaw tracks, forward and rear of the chuck body, as well as radial of the chuck body.

References Cited by the Examiner
UNITED STATES PATENTS

| | | | |
|---|---|---|---|
| 1,034,419 | 8/12 | Catucci | 279—60 |
| 1,711,769 | 5/29 | Bell | 279—60 |
| 2,524,006 | 9/50 | Capellazzi | 279—123 |
| 2,828,134 | 3/58 | Buck | 279—121 |

ROBERT C. RIORDON, Primary Examiner.